United States Patent
Radunovic et al.

(10) Patent No.: US 9,401,832 B2
(45) Date of Patent: Jul. 26, 2016

(54) LONG-RANGE NODES WITH ADAPTIVE PREAMBLES FOR COEXISTENCE

(75) Inventors: Božidar Radunovic, Cambridge (GB); Ranveer Chandra, Kirkland, WA (US); Dinan Srilal Gunawardena, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 413 days.

(21) Appl. No.: 13/111,970

(22) Filed: May 20, 2011

(65) Prior Publication Data
US 2012/0294233 A1    Nov. 22, 2012

(51) Int. Cl.
  H04L 12/43    (2006.01)
  H04L 1/00     (2006.01)
  H04L 27/00    (2006.01)
  H04L 27/26    (2006.01)
  H04L 5/00     (2006.01)
  H04L 25/02    (2006.01)

(52) U.S. Cl.
  CPC .......... *H04L 27/0006* (2013.01); *H04L 1/0038* (2013.01); *H04L 5/0032* (2013.01); *H04L 5/0051* (2013.01); *H04L 5/0062* (2013.01); *H04L 27/2613* (2013.01); *H04L 27/2691* (2013.01); *H04L 27/2694* (2013.01); *H04L 25/0226* (2013.01); *H04L 27/2656* (2013.01); *H04L 27/2663* (2013.01); *H04L 27/2665* (2013.01)

(58) Field of Classification Search
  CPC .............................. H04L 27/261; H04L 5/0048
  USPC ....................................................... 370/461
  See application file for complete search history.

(56) References Cited

U.S. PATENT DOCUMENTS

| | | | |
|---|---|---|---|
| 7,599,332 B2 | 10/2009 | Zelst et al. | |
| 2003/0072256 A1 | 4/2003 | Kim | |
| 2005/0025104 A1* | 2/2005 | Fischer et al. | 370/338 |
| 2005/0180315 A1 | 8/2005 | Chitrapu et al. | |
| 2005/0233709 A1 | 10/2005 | Gardner et al. | |
| 2007/0066314 A1 | 3/2007 | Sherman et al. | |
| 2007/0135162 A1 | 6/2007 | Banerjea et al. | |
| 2007/0207823 A1 | 9/2007 | Van Nee et al. | |
| 2008/0032654 A1 | 2/2008 | Qiu et al. | |
| 2008/0070510 A1 | 3/2008 | Doppler et al. | |
| 2008/0253341 A1* | 10/2008 | Cordeiro et al. | 370/338 |
| 2009/0047986 A1 | 2/2009 | Chen et al. | |

(Continued)

OTHER PUBLICATIONS

Motamedi, et al., "MAC Protocol Design for Spectrum-agile Wireless Networks: Stochastic Control Approach", Retrieved at <<http://ieeexplore.ieee.org/stamp/stamp.jsp?tp=&arnumber=4221527>>, 2nd IEEE International Symposium on New Frontiers in Dynamic Spectrum Access Networks, Apr. 17-20, 2007, pp. 448-451.

(Continued)

*Primary Examiner* — Shaq Taha
(74) *Attorney, Agent, or Firm* — Micky Minhas

(57) ABSTRACT

Wireless protocols in the unlicensed spectrum are developed for different requirements in terms of transmit range and power, which makes it difficult for multiple nodes having disparate transmit ranges to coexist in the same unlicensed spectrum. A short-range wireless node uses adaptive preambles to signal presence to long-range wireless nodes outside of its transmit range. In addition, a long-range wireless node detects an adapter preamble and backs-off transmissions for reservation period dedicated to short-range nodes.

20 Claims, 11 Drawing Sheets

(56) References Cited

U.S. PATENT DOCUMENTS

| | | | |
|---|---|---|---|
| 2009/0224975 | A1 | 9/2009 | Xhafa et al. |
| 2009/0296602 | A1 | 12/2009 | Bange et al. |
| 2009/0316757 | A1 | 12/2009 | ten Brink et al. |
| 2010/0097950 | A1 | 4/2010 | Jeon |
| 2010/0135274 | A1* | 6/2010 | Hong et al. .................. 370/345 |
| 2010/0172423 | A1 | 7/2010 | Chrabieh |
| 2010/0226348 | A1 | 9/2010 | Thoukydides |
| 2010/0254392 | A1 | 10/2010 | Katar et al. |
| 2010/0260106 | A1 | 10/2010 | Hwang et al. |
| 2010/0260133 | A1 | 10/2010 | Sampath et al. |
| 2011/0205924 | A1* | 8/2011 | Gonikberg et al. ........... 370/252 |
| 2011/0255557 | A1* | 10/2011 | Varadarajan et al. ......... 370/474 |
| 2012/0201315 | A1 | 8/2012 | Zhang et al. |
| 2012/0294232 | A1 | 11/2012 | Radunovic et al. |

OTHER PUBLICATIONS

Franklin, et al., "Cognitive Radio Test-bed based on ECMA-392 International Standard", Retrieved at <<http://ieeexplore.ieee.org/stamp/stamp.jsp?tp=&arnumber=5624263>>, 7th International Symposium on Wireless Communication Systems (ISWCS), Sep. 19-22, 2010, pp. 1026-1030.

Ghosh, et al., "Coexistence Challenges for Heterogeneous Cognitive Wireless Networks in TV White Spaces", Retrieved at <<http://faculty.washington.edu/ghoshc/Heterogeneous_CWNs_TVWS.pdf>>, IEEE Wireless Communications Magazine, 2010, pp. 1-15.

Howitt, et al., "IEEE 802.15.4 Low Rate—Wireless Personal Area Network Coexistence Issues", Retrieved at <<http://morse.colorado.edu/~tlen5520/Papers/802154WiFi.pdf>>, IEEE Wireless Communications and Networking, vol. 03, Mar. 20, 2003, pp. 1481-1486.

Ghosh, et al., "Coexistence Challenges for Heterogeneous Cognitive Wireless Networks in TV White Spaces", Retrieved at <<http://faculty.washington.edu/ghoshc/Heterogeneous_CWNs_TVWS.pdf>>, IEEE Wireless Communication Magazine, Dec. 2010, pp. 1-15.

Bahl, et al., "White Space Networking with Wi-Fi like Connectivity", Retrieved at <<http://bnrg.eecs.berkeley.edu/~randy/Courses/CS268.F09/papers/26_whitefi.pdf>>, ACM SIGCOMM Conference, Aug. 17-21, 2009, 12 Pages.

Chen, et al., "MAC and PHY Proposal for 802.11af", Retrieved at <<https://mentor.ieee.org/802.11/dcn/10/11-10-0258-01-00af-mac-and-phy-proposal-for-802-11af.pdf>>, Mar. 2010, pp. 1-22.

Drake, et al., "Energy Efficiency Comparisons of Wireless Communication Technology Options for Smart Grid Enabled Devices", Retrieved at <<http://www.brymercreative.com/geal_2010/images/120910_zigbee.pdf>>, Dec. 9, 2010, pp. 1-14.

"FCC : Second Memorandum Opinion and Order", Retrieved at <<http://www.fcc.gov/Daily_Releases/Daily_Business/2010/db0923/FCC-10-174A1.pdf>>, Sep. 23, 2010, pp. 1-88.

Huang, et al., "Beyond Co-Existence : Exploiting WiFi White Space for ZigBee Performance Assurance", Retrieved at <<http://www.cse.msu.edu/~glxing/docs/icnp10-wise-final.pdf>>, 18th IEEE International Conference on Network Protocols (ICNP), Oct. 5-8, 2010, 10 Pages.

"Amendment 5 : Spectrum and Transmit Power Management Extensions in the 5GHz Band in Europe", Retrieved at <<http://ieeexplore.ieee.org/stamp/stamp.jsp?tp=&arnumber=4014512>>, 2003, 80 Pages.

Jamieson, et al., "Understanding the Real-World Performance of Carrier Sense", Retrieved at <<http://nms.lcs.mit.edu/papers/ewind05-csma.pdf>>, ACM SIGCOMM 2005 Conference, Aug. 22-26, 2005, 6 Pages.

Jung, et al., "A Power Control MAC Protocol for Ad Hoc Networks", Retrieved at <<http://www.crhc.illinois.edu/wireless/papers/p047-jung.pdf>>, The 8th ACM International Conference on Mobile Computing and Networking, Sep. 23-28, 2002, 12 Pages.

Kim, et al., "Improving Spatial Reuse through Tuning Transmit Power, Carrier Sense Threshold, and Data Rate in Multihop Wireless Networks", Retrieved at <<http://index.cs.uiuc.edu/group_seminar_past/summer06/group_seminar_slides/kim07-17-06.pdf>>, 12th Annual International Conference on Mobile Computing and Networking, Sep. 23-26, 2006, 12 Pages.

Kim, et al., "Cyclostationary Approaches to Signal Detection and Classification in Cognitive Radio", Retrieved at <<http://ieeexplore.ieee.org/stamp/stamp.jsp?tp=&arnumber=4221497>>, 2nd IEEE International Symposium on New Frontiers in Dynamic Spectrum Access Networks, Apr. 17-20, 2007, pp. 1-5.

Lansford, et al., "Wi-Fi (802.11b) and Bluetooth: Enabling Coexistence", Retrieved at <<http://ieeexplore.ieee.org/stamp/stamp.jsp?tp=&arnumber=953230>>, IEEE Network, vol. 15, No. 5, Sep.-Oct. 2001, pp. 20-27.

"Lyrtech Small Form Factor Software Defined Radio", Retrieved at <<http://www.lyrtech.com/Products/SFF_SDR_development_platforms.php>>, Retrieved Date: Mar. 1, 2011, p. 1.

Radunovic, et al., "Rate Performance Objectives of Multi-Hop Wireless Networks", Retrieved at <<http://citeseerx.ist.psu.edu/viewdoc/download?doi=10.1.1.58.4803&rep=rep1&type=pdf>>, IEEE Transactions on Mobile Computing, vol. 03, No. 4, Oct.-Dec. 2004, 12 Pages.

Schmidl, et al., "Robust Frequency and Timing Synchronization for OFDM", Retrieved at <<http://home.mit.bme.hu/~kollar/papers/Schmidl2.pdf>>, IEEE Transactions on Communications, vol. 45, No. 12, Dec. 1997, pp. 1613-1621.

Tufvesson, et al., "Time and Frequency Synchronization for OFDM using PN-Sequence Preambles", Retrieved at >>http://ieeexplore.ieee.org/stamp/stamp.jsp?tp=&arnumber=797329>>, IEEE VTS 50th Vehicular Technology Conference, VTC, 1999, pp. 2203-2207.

Yang, et al., "On Physical Carrier Sensing in Wireless Ad Hoc Networks", Retrieved at <<http://www.cs.uiuc.edu/homes/haiyun/cs598hl/papers/carrierINFOCOM05.pdf>>, Proceedings IEEE INFOCOM, 24th Annual Joint Conference of the IEEE Computer and Communications Societies, Mar. 13-17, 2005, 11 Pages.

Zhang, et al., "Experimenting Software Radio with the Sora Platform", Retrieved at <<http://conferences.sigcomm.org/sigcomm/2010/papers/sigcomm/p469.pdf>>, ACM SIGCOMM 2010 Conference, Aug. 30-Sep. 3, 2010, pp. 469-470.

Zhou, et al., "ZiFi: Wireless LAN Discovery via ZigBee Interference Signatures", Retrieved at <<http://www.cse.msu.edu/~glxing/docs/zifi-mobicom10.pdf>>, The 16th Annual International Conference on Mobile Computing and Networking and the 11th ACM International Symposium on Mobile Ad Hoc Networking and Computing, Sep. 20-24, 2010, 12 Pages.

"Office Action Dated Sep. 9, 2013", Application No. 13/111,965, Sep. 9, 2013, 8 Pages.

Response to the Non-Final Office Action for U.S. Appl. No. 13/111,965, Filed Date: Mar. 26, 2014, 12 pages.

Final Office Action for U.S. Appl. No. 13/111,965, Mailed Date: Jul. 21, 2014, 7 pages.

Response to the Final Office Action for U.S. Appl. No. 13/111,965, Filed Date: Oct. 21, 2014, 14 pages.

Non-Final Office Action for U.S. Appl. No. 13/111,965, Mailed Date: Mar. 18, 2015, 8 pages.

Response to the Non-Final Office Action for U.S. Appl. No. 13/111,965, Filed Date: Jul. 20, 2015, 11 pages.

Applicant Initiated Interview Request Form for U.S. Appl. No. 13/111,965, Date of Interview: Jul. 16, 2015, 3 pages.

Applicant Initiated Interview Summary for U.S. Appl. No. 13/111,965, Mailed Date: Jul. 24, 2015, 3 pages.

Notice of Allowance and Fees Due for U.S. Appl. No. 13/111,965, Mailed Date: Nov. 4, 2015, 10 pages.

\* cited by examiner

LONG-RANGE NODES WITH ADAPTIVE PREAMBLES FOR COEXISTENCE

CROSS-REFERENCE TO RELATED APPLICATIONS

The present application is related to U.S. patent application Ser. No. 13/111,965, entitled "Short-Range Nodes with Adaptive Preambles for Coexistence" and filed on May 20, 2011, which is specifically incorporated by referenced herein for all that it discloses and teaches.

BACKGROUND

In many jurisdictions, one or more ranges within the radio frequency (RF) spectrum are not regulated by a licensing regime. For example, with the transition to digital television by the United States in June 2009, a substantial amount of RF spectrum previously dedicated to licensed analog television broadcasts has been made available to unlicensed users, and these newly available RF spectrum channels are referred to collectively as Television White Spaces (TVWS). Although some regulation remains for the unlicensed spectrum, various standards bodies have targeted the unlicensed spectrum in efforts to manage communications within these frequency bands.

Accordingly, wireless protocols in the unlicensed spectrum have been developed for different requirements in terms of range and power. However, the different parameters of such wireless protocols make it difficult for communications of different protocols to coexist in the same unlicensed channel. For example, intentionally low-power Zigbee® nodes are frequently starved by higher-power WiFi® nodes. Furthermore, as various incompatible standards become more accepted and their networks become more widely distributed, the challenges of coexistence among wireless networks will become more severe.

Disparate power levels particularly contribute to these challenges. For example, in many wireless communication protocols, nodes "listen" for other communications within their operating RF frequency spectrum. If the first node detects that another node is transmitting at that time (e.g., carrier sensing), the first node "backs off" for a short period of time (e.g., collision avoidance) and tries again. However, disparate transmission power levels between the nodes translate to different transmit ranges (e.g., the transmit range is the distance from which a packet can be transmitted from one node and received and decoded by another node). As such, a higher power node may sit outside the standard transmit range of a lower power node and therefore not detect the transmissions of the lower power node, although the lower power node can detect the transmissions of the higher power node. In this example, since the higher power node does not "hear" the lower power node, the higher power node may unwittingly transmit at a time that interferes with transmission of the lower power node. The throughputs of both nodes are diminished during periods of such interference.

Further, the lower power node can detect the transmissions of the higher power node and will therefore back off if the lower power node detects a transmission of the higher power node. However, the same is not true for the higher power node—because the higher power node does not detect transmissions of the lower power node, the higher power node does not back off. As such, the unrestrained transmission of the higher power node effectively starves the lower power node of bandwidth.

SUMMARY

Implementations described and claimed herein address the foregoing problems by providing a short-range wireless node that uses adaptive preambles to signal its presence to long-range wireless nodes outside of its transmit range. In addition, the long-range wireless nodes detect adaptive preambles and, in response, delay transmission for a reservation period dedicated to short-range nodes.

For example, a long-range node receives from the radio frequency spectrum a packet with an adaptive preamble, determines, based on the received adaptive preamble, a correlation factor for one or more candidate adaptive preamble lengths; and declares a detection of an adaptive preamble, if the correlation factor satisfies an adaptive preamble condition. The long-range node can also delay transmission responsive to the declaration of the detection of the adaptive preamble for a reservation period, wherein the reservation period applies to long-range nodes and not to short-range nodes.

In some implementations, articles of manufacture are provided as computer program products. One implementation of a computer program product provides a tangible computer program storage medium readable by a computing system and encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The availability and limited regulation of the unlicensed spectrum has contributed to the wide acceptance of communications solutions that operate in the unlicensed spectrum. Various applications and devices have been developed for this space, including WLANs using WiFi® devices, Bluetooth® headsets, and low-power Zibgee® sensors, each using diverse standards that operate in the same unlicensed spectrum.

When wireless communications devices that operate in the same unlicensed spectrum are within interference range of each other, they are said to coexist within that spectrum. Coexistence of devices having disparate power levels can degrade the performance on their respective networks because the higher power node may not detect transmissions of the lower power node and therefore transmit at a time that interferes with the transmissions of the lower power node. The interference corrupts the signals transmitted by both nodes, causing one or more receiving nodes to miss transmitted packets (e.g., an interfered packet fails checksum evaluation by the receiving node, which requests a re-transmission of the packet).

Furthermore, while the lower power node can detect transmissions of the higher power node, the lower power node may back off when it detects these transitions. In contrast, certain networking configurations, the higher power node cannot hear the transmissions of the lower power node and will continue to transmit whenever it needs to, regardless of whether the lower power node attempting to transmit at the same time. Accordingly, the lower power node is likely to back off most the time as it detects transmissions of a higher power node, which is oblivious to the lower power node's transmissions.

Figure 1:
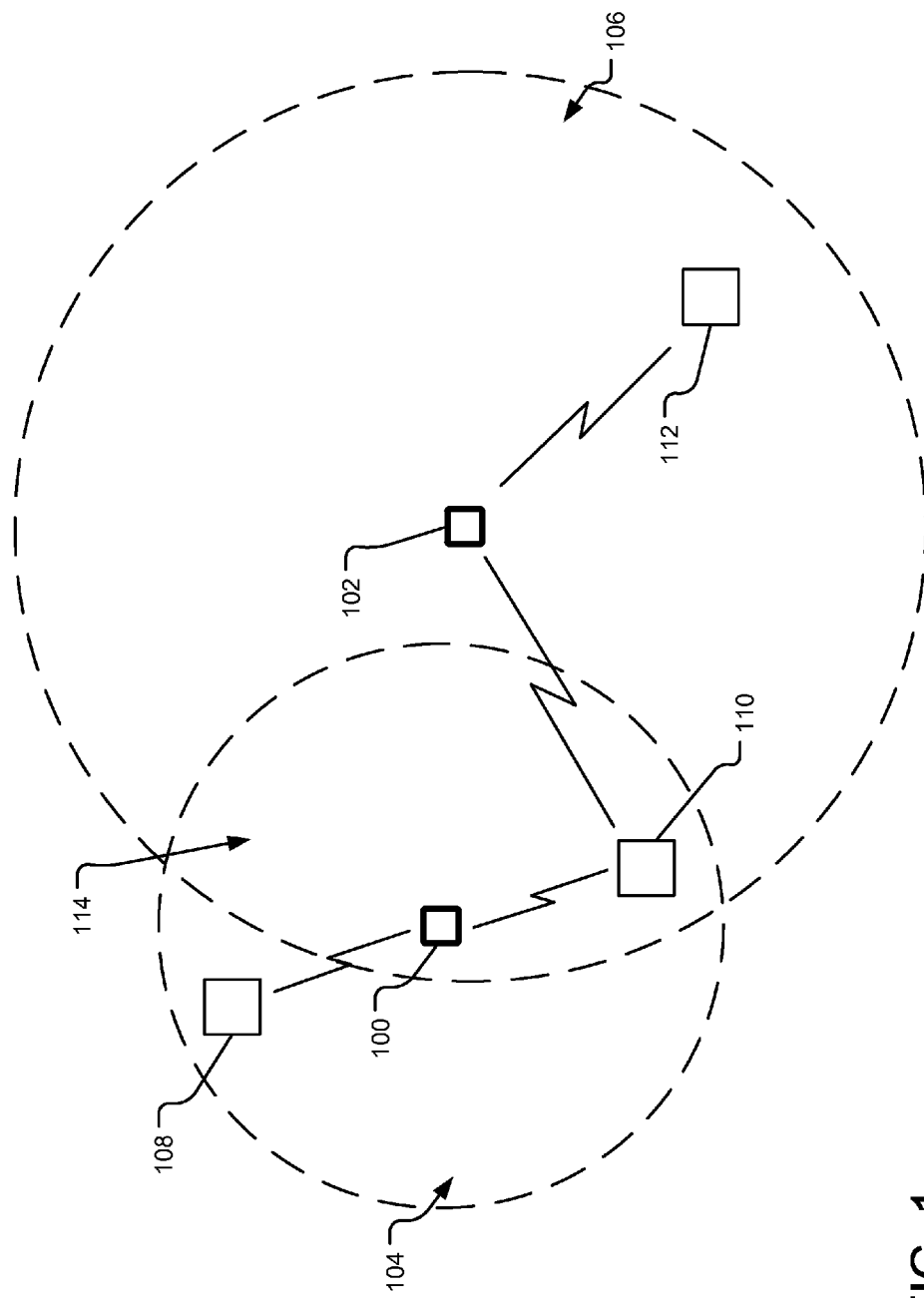
FIG. 1 illustrates example coexisting nodes transmitting at disparate power levels and coexisting within the same unlicensed spectrum.

FIG. 1 illustrates example coexisting nodes 100 and 102 transmitting at disparate power levels and coexisting within the same unlicensed spectrum. For example, the coexisting nodes 100 and 102 may represent wireless workstations, servers, network access points, and other wireless devices operating in the same unlicensed spectrum. Within networks 104 and 106, each node is classified according to its power level and/or its transmit range. In many circumstances, power level relates to transmit range, but it should be understood that nodes can be classified according to either characteristic. In the illustrated implementation, disparate power levels translate to disparate transmit ranges, although other characteristics can contribute to disparate transmit ranges, including without limitation physical obstructions (e.g., building walls) and atmospheric factors. In FIG. 1, the node 100 transmits at a lower power level than the node 102. As such, the node 100 is classified as "low-power" and "short-range" and the node 102 is classified as "high-power" and "long-range" relative to each other. More than two classifications may be employed, and such classifications may be based on characteristics other than power and transmit range.

To further describe the operating environment of the networks 104 and 106, the short-range node 100 is characterized by a transmit range illustrated by the dashed-line circle that surrounds it in FIG. 1. Based on this transmit range, transmissions from the node 100 are received by nodes 108 and 110. Likewise, the long-range node 102 is characterized by a transmit range illustrated by the dashed-line circle that surrounds it in FIG. 1. Based on this transmit range, transmissions from the node 102 are received by nodes 110 and 112.

Of particular interest is an overlapping region 114, in which the transmissions of node 100 and the transmissions of node 102 can be received by the node 110. However, if both nodes 100 and 102 attempt to transmit to the node 110 concurrently with overlapping transmission frequencies, the transmitted signals will interfere with each other and neither transmission is likely to be received and decoded correctly by the node 110. This interference degrades performance of both networks because interfered packets are likely to be re-transmitted in an effort to accurately communicate with the node 110. Furthermore, the transmissions of the node 102 have a sufficient transmit range to be detected by the node 100, but the transmissions of the node 100 do not have a sufficient transmit range to be detected by the node 102. As such, the node 102 may transmit even when the node 100 is transmitting in the same spectrum, likely resulting in unintended interference.

To avoid such interference among coexisting nodes within the same spectrum, the short-range node 100 supports transmission of packets having adaptive preambles, which can extend the detectable transmit range of the node 100 without modifying the power level of transmissions of node 100. Likewise, the long-range node 102 supports detection of packets having adaptive preambles, which allows the node 102 to avoid interference with transmissions from the low-power node 100. In one implementation, the node 102 backs-off transmissions for a reservation period dedicated to short-range nodes, before contending again for transmission in the spectrum.

As discussed, without modification, the long-range node 102 is unable to detect the energy (e.g., transmissions) of the short-range node 100 because the long-range node 102 is outside of the transmit range of the short-range node 100. Accordingly, such power/range asymmetry can prevent accurate carrier sensing and collision avoidance by the long-range node 102. However, by supporting adaptive preambles, the nodes 100 and 102 can allow the node 102 to detect the transmissions by the node 100 even if the node 102 is outside of the transmit range of the node 100.

Figure 2:
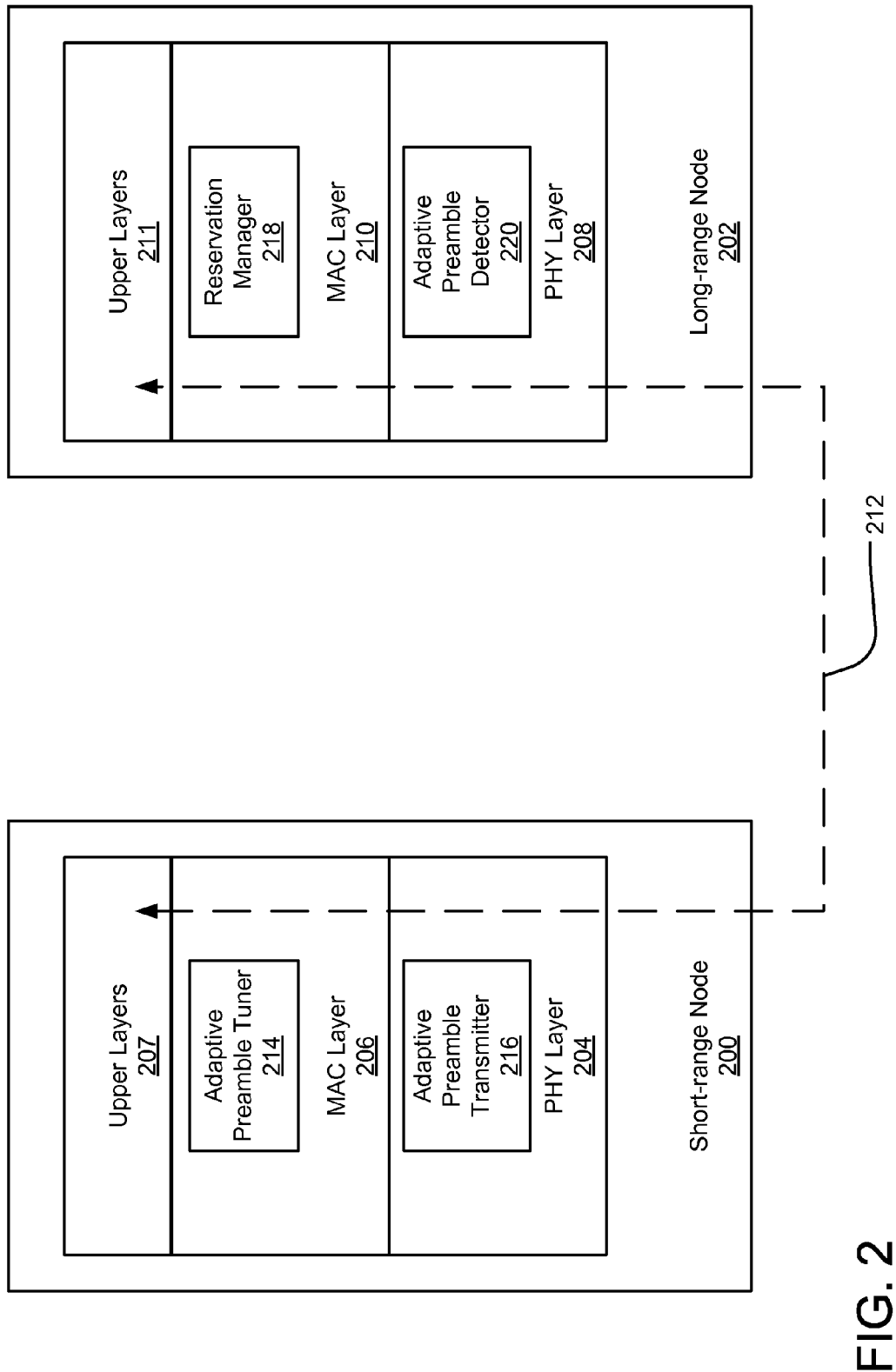
FIG. 2 illustrates communication stack layers of an example short-range node and an example long-range node.

FIG. 2 illustrates communication stack layers of an example short-range node 200 and an example long-range node 202. The short-range node 200 includes a physical (PHY) layer 204, a media access control (MAC) layer 206, and potentially upper layers 207 in its communications stack. Likewise, the long-range node 202 includes a physical (PHY) layer 208, a media access control (MAC) layer 210, and potentially upper layers 211 in its communications stack. The communication stacks of each node process communications between each node and one or more other nodes, as shown through a wireless communications link 212. Each communication stack may be embodied in the combination of hardware, software modules, circuitry, and/or physical structures.

The MAC layer 206 includes an adaptive preamble tuner 214, which monitors communication performance issues and adjusts the preambles transmitted by the short-range node 200 accordingly. In one implementation, the adaptive preamble tuner 214 monitors packet losses and sets the length of transmitted preambles from the short-range node 200. The PHY layer 204 includes an adaptive preamble transmitter 216, which generates the preambles as instructed by the adaptive preamble tuner 214 and transmits them and other associated packet data into a network.

The PHY layer 208 includes an adaptive preamble detector 220, which monitors communications and detects adaptive preambles from short-range nodes. In one implementation, the adaptive preamble detector 220 includes a correlator capable of detecting preamble of one or more predefined candidate adaptive preamble lengths. The MAC layer 210 includes a reservation manager 218, which manages transmission activity of the long-range node 202, responsive to detection of adaptive preambles and manages the resulting back-off activity during a predefined reservation period.

Figure 3:
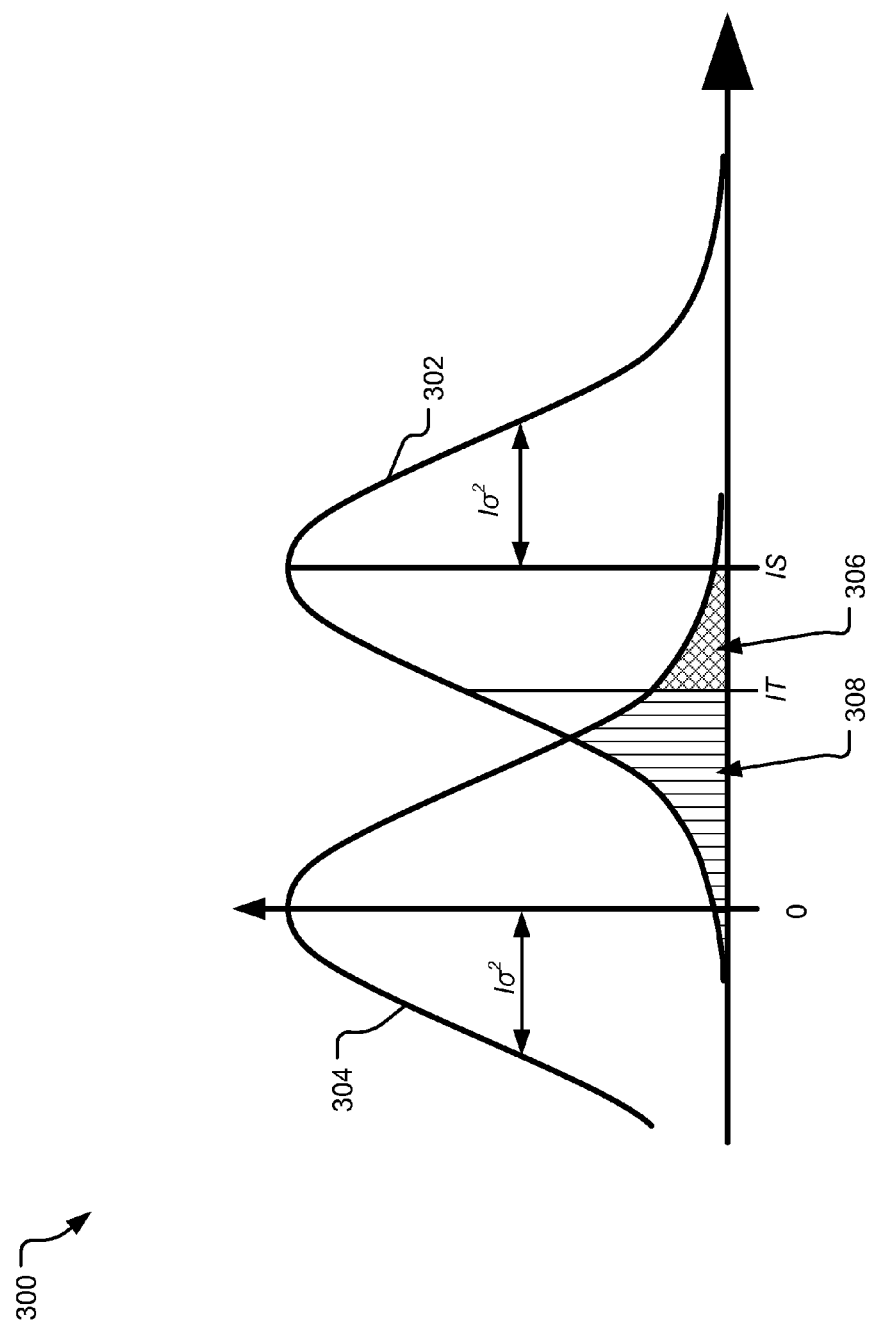
FIG. 3 illustrates example probability distribution functions associated with detection of an adaptive preamble.

FIG. 3 illustrates example probability distribution functions 300 associated with detection of an adaptive preamble. Existing non-adaptive preambles are designed to operate at SNR levels present when packet reception and decoding are possible (e.g., above 5 dB). In contrast, adaptive preambles extend the functionality of preamble detection to lower SNR levels.

Using an example noise model, given a known preamble ($P_0, P_1, \ldots, P_{I-1}$), where each symbol in the preamble is $P_i \in \{-1, 1\}$ and a wireless transmission represented as a sequence of symbols $Y_0, Y_1, \ldots$, each received symbols is represented by:

$$Y_i = SX_i + N \quad (1)$$

where S represents the transmit power, $X_i$ represents the transmitted symbol, and $N_i \sim N(0, \sigma^2)$ represents the added white noise with a variance $\sigma^2$.

If the transmitter starts transmitting the preamble at instance n, the transmitted symbol is represented by $X_{n+1} = P_i$, for all $0 \leq i \leq I$. An assumption is made that the transmitter either transmits a preamble or it is idle; hence, $X_{n+1} = 0$, for all $i < 0$ and $i \geq I$. Accordingly, a receiving node is responsible for detecting whether preamble transmission has started at time n.

In one implementation, a preamble is detected by correlating each observed subsequence $(Y_n, Y_{n+1}, Y_{n+2}, \ldots, Y_{N+I-1})$ with the preamble, obtaining a correlation factor:

$$C_n = \sum_{i=0}^{I-1} Y_{n+i} P_i \quad (2)$$

$$= \sum_{i=0}^{I-1} SX_{n+i} P_i + \sum_{i=0}^{I-1} N_{n+i} P_i = X + N \quad (3)$$

Based on Equation (2), a preamble is deemed to be detected at time n if $C_n \geq IT$, where IT is a threshold that is assumed to scale linearly with the length of the preamble I.

If the sequence $(Y_n, Y_{n+1}, Y_{n+2}, \ldots, Y_{N+I-1})$ contains the preamble (e.g., $X_{n+1} = P_i$), then each summand in the first part of Equation (3) (i.e., $X_{n+i} P_i$) equals 1. All such summands add coherently, yielding:

$$X = \sum_{i=0}^{I-1} SX_{n+i} P_i \quad (4)$$

where I is the length of the preamble. Variable $$N = \sum_{i=0}^{I-1} N_{n+i} P_i$$

is the sum of the I Gaussian random variables. Hence, N also represents the Gaussian random variable $N_i \sim N(0, I\sigma^2)$ with a variance $I\sigma^2$. Consequently, $C_n = X + N$ has a mixed Gaussian distribution, such as illustrated in FIG. 3.

A detector can make two types of errors when attempting to detect a preamble. The first error type is called a "false positive," meaning that the detector declares that a preamble is present at time n (i.e., $C_n \geq IT$), when, in fact, a preamble is absent. The second error type is called a "false negative," meaning that the detector does not detect the presence of a preamble at time n (i.e., $C_n < IT$), when, in fact, a preamble is present.

The probability distribution of $C_n$, when the preamble is present is shown as distribution 302, and the probability distribution of $C_n$ when the preamble is absent is shown as distribution 304. The probability distribution of the false positive corresponds to the region 306, articulated as:

$$P_{fp} = \frac{1}{2}\left(1 + \mathrm{erf}\left(\frac{IT}{\sqrt{2I\sigma^2}}\right)\right) \quad (5)$$

The probability of a false negative corresponds to the region 308, articulated as:

$$P_{fn} = \frac{1}{2}\left(1 + \mathrm{erf}\left(\frac{I(S-T)}{\sqrt{2I\sigma^2}}\right)\right) \quad (6)$$

Equations (5) and (6) show that the numerator grows linearly with the preamble length I and the denominator grows sub-linearly, resulting the following observation:

OBSERVATION 1—For any fixed signal strength S and noise power $\sigma^2$, the probabilities of false positives and false negatives may be arbitrarily decreased by increasing the preamble length.

As such, increasing the preamble length increases the accuracy of preamble detection, albeit with a slight increase in per-packet overhead. Furthermore, various implementations of the described technology may include (1) a repetitive preamble, which allows detection at low SNRs; (2) support for preamble length adaptation; and (3) a detection mechanism that is robust to interference. One or more of these features can increase performance in one or more coexistent networks. Moreover, some aspects of the described technology may influence the design of the transmitter, the design of the receiver, and/or the designs of both the transmitter and the receiver. It should be understood also that other noise models may be employed in an implementation of the described technology.

Detection of a preamble relies on a correlator circuit. At least one existing wireless communications protocol employs a preamble that consists of 4 Orthogonal Frequency Division Multiplexing (ODFM) symbols. The first OFDM symbol (referred to herein as "A") is used for an adaptive gain control algorithm. The second OFDM symbol (referred to herein as "P") is used for a course-grained time synchronization. The third and fourth OFDM symbols are used for channel estimation.

One of the main issues when applying correlation to OFDM is that the transmitter's clock and receiver's clock are not synchronized, which introduces a random phase offset in the received signal. Thus, instead of each received symbol being represented as shown in Equation (1), each received symbol is represented by:

$$Y_i = SX_i e^{j\theta} + N_i \quad (7)$$

where $\theta$ represents an unknown constant phase bias, which is introduced into the correlation factor of Equation (2). However, the preamble $P = (P', P')$ may be divided into two equal parts $P' = (P_0, P_1, \ldots, P_{(S/2)-1})$, where S is the number of samples per OFDM symbol. The correlation is then performed in the following way:

$$c_n = \left(\sum_{i=0}^{\frac{S}{2}-1} P_i^* Y_{n+i}\right)\left(\sum_{i=\frac{S}{2}}^{S-1} P_i^* Y_{n+i}\right)^* \quad (8)$$

where * denote complex conjugate. Accordingly, when the preamble is being transmitted, the first sum and the second sum will be the same because the first half of the preamble is the same as the second half. However, because the second sum is conjugate, when multiplied with the first sum, the second sum will cancel the unknown phase bias θ.

In the context of the described technology, longer preambles can introduce complexity into the design of a correlator used to detect the longer preambles. For example, to calculate the correlation given in Equation (2), a design may implement I multiplications with constant coefficients and an adder of length I. Hence, the length of the correlator circuit can scale linearly with the length of the preamble I. However, the traditional notion of a synchronization algorithm design for OFDM aims to identify precisely the time instant n (at sub μs precision) at which the received packet starts.

In contrast, a long-range node only needs to detect (and not decode) a packet transmission by a short-range node. Therefore, detection with such precise timing is unnecessary. It is sufficient to detect the packet transmission with a timing precision even as high as a few tens of μs. In this context, repetitive preambles provide acceptable performance without excessive complexity. Accordingly, in one implementation, a PHY header having an adaptive preamble form of repetitive preamble components and an OFDM preamble improves detection in asymmetric networking configurations, although other adaptive preambles may also be used.

Figure 4:
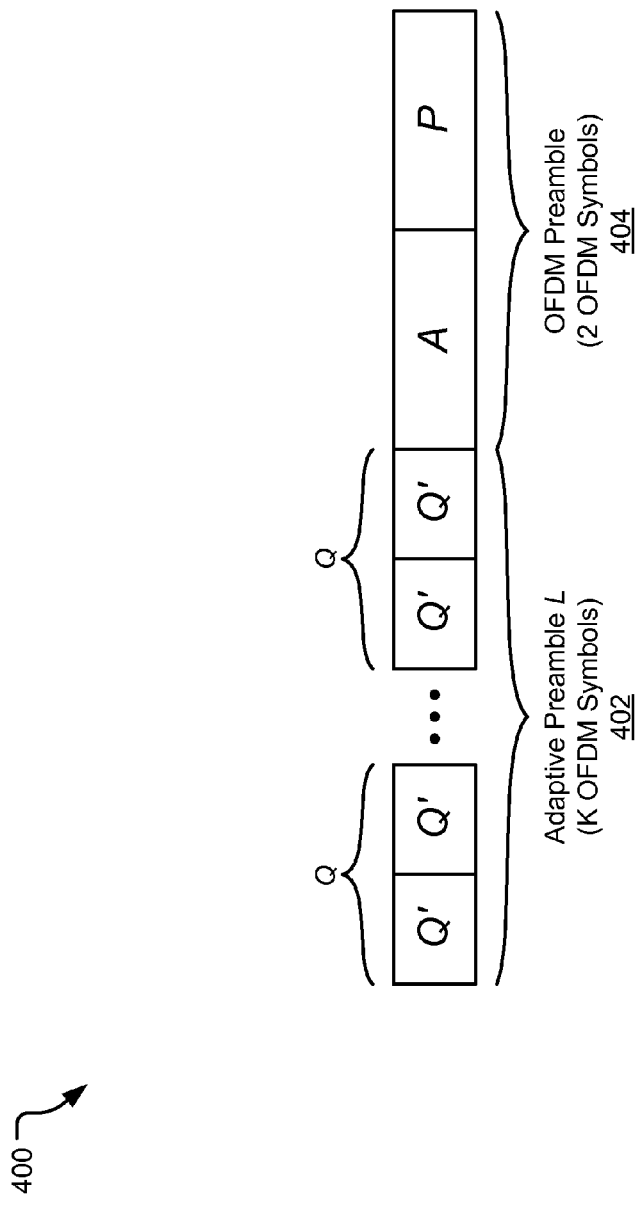
FIG. 4 illustrates an example structure of a PHY header with an adaptive preamble and an OFDM preamble.

FIG. 4 illustrates an example structure of a PHY header 400 with an adaptive preamble 402 and an OFDM preamble 404. A symmetric preamble $Q=(Q', Q')$ represents a building block of an adaptive preamble. Sequence $Q'=(Q_0, \ldots, Q_{S/2-1})$ represents a pseudo-random sequence that is different than the course-grained time synchronization P symbol, such that $Q' \neq P \cdot S$ represents the number of samples per preamble, and therefore the length of Q is the same as one OFDM symbol. The repetitive preamble $L=(Q, \ldots, Q)$ consists of K repetitions of Q and lasts K OFDM symbols, as shown in FIG. 4.

The correlation factor for the one half preamble Q' is represented by:

$$C_n^S = \sum_{i=0}^{\frac{S}{2}-1} (Q_i')^* Y_{n+1}. \tag{9}$$

Accordingly, the correlation factor is determined as follows:

$$C_n = \left(\sum_{k=0}^{K-1} C_{n+kS}^S\right)\left(\sum_{k=0}^{K-1} C_{n+\frac{S}{2}+kS}^S\right)^*. \tag{10}$$

The correlation factor calculation (1) evaluates the correlations of the first halves of each of the K repetitions in the preamble L and finds the sum of these "first half" correlations, (2) evaluates the correlations of the second halves of each of the K repetitions in the preamble L and finds the sum of these "second half" correlations, (3) conjugates the sum of the second half correlations, and (4) multiplies the complex conjugate of the second half correlations sum with the first half correlations sum. In this manner, both factors in Equation (10) grow with K, instead of I and, by multiplying the complex conjugate of the second half correlations sum, the unknown constant phase bias θ is removed.

Figure 5:
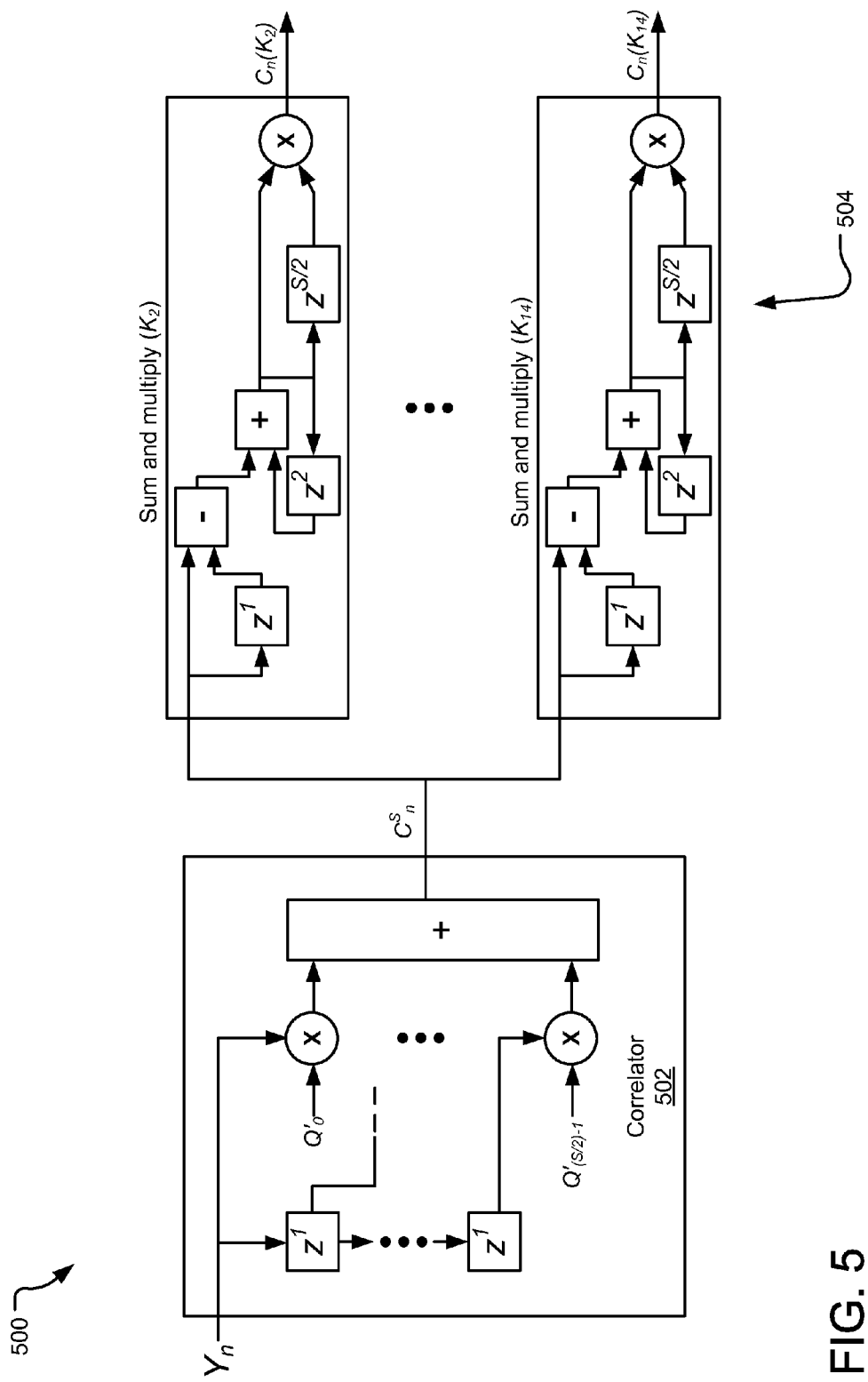
FIG. 5 illustrates an example adaptive detector circuit configured to detect different levels of preamble repetition.

FIG. 5 illustrates an example adaptive detector circuit 500 configured to detect different levels of preamble repetitions. A correlator circuit 502 of length S/2 receives a symbol stream $Y_n$, as input and generates a correlation factor $C_n^S$ for each symbol as output. Four parallel detection components 504 corresponding to K={2, 6, 10, 14} (representing candidate adaptive preamble lengths) each comprise three delay elements z and a complex multiplier to implement the summations and multiplication of Equation (10). The set K provides a balance between granularity of detection sensitivity and receiver complexity. Four detection thresholds, $T_2$, $T_6$, $T_{10}$, and $T_{14}$, are predefined for each of the possible values of K (e.g., the thresholds scale with K). If the correlation factor exceeds one of the detection thresholds, it is deemed to have satisfied an adaptive preamble condition, signaling detection of an adaptive preamble. The same set of thresholds is used by all long-range nodes. A long-range node detects an adaptive preamble if any of the four detector components 504 determines that the associated correlation factor exceeds its corresponding threshold.

A detector circuit 500 does not need to know which value of K a transmitter has chosen to transmit. For example, if the transmitter chooses K=10 repetitions, the detector component for K=10 in the receiving long-range node declares detection of the preamble. If the detector component for K=10 misses the preamble, then it is very likely that the detector component for K=14 will also miss the preamble, because, in addition to 10 repetitions of the preamble Q, the detector component for K=14 also admits for other arbitrary OFDM symbols and the correlation level is lower than the threshold for a preamble of length 14. Similarly, the detector components for K=2 and K=6 are also likely to miss the preamble if K=10 misses it.

Although FIG. 5 is presented as adapted to the example of OFDM physical layers, it should be understood that correlation designs may be generalized to other types of physical layers and correlation algorithms.

Short-range nodes can use adaptive preambles to protect their ongoing transmissions. Accordingly, long-range nodes are configured to detect the preambles even when the received signal is low in power. Nevertheless, long-range nodes are also configured to avoid false positives when there are no ongoing low-power transmissions from a short-range transmitter. A first type of false positive to be avoided is referred to as a "false positive against the background noise," denoting an event when a correlation against background noise happens to exceed the correlation threshold. Another type of false positive is referred to as a "false positive against high-power interference," in which a distant long-range transmission without an adaptive preamble still happens to trigger a correlation. These types of false positives trigger a trade off between detecting adaptive preambles at a very low SNR and avoiding false positives.

To address this problem, a short preamble H is defined for long-range nodes with the same structure as L, although it is not adaptive and consists of two repetitions, such that H=(R, R). Therefore, H has the duration of K=2 OFDM symbols. Preambles L and H are mutually independent pseudo-random preambles (Q and R are different). Each long-range transmission is prepended with H. Some short-range nodes that do not need extra protection may also prepend the H preamble.

In order to deal with the false positives from interference, the following detection algorithm is applied:

if $C_n^L \geq T_L$ and

Detected: $C_n^H < T_H$ and

RSSI<carrier sensing threshold $\qquad$ (11)

where $C_L(t)$ is the correlation factor with the preamble L; $C_h(t)$ is the correlation with the preamble H; $T_L$ and $T_H$ are the corresponding thresholds; and RSSI is the received signal strength indicator.

The main intuition for this algorithm is as follows. The variance in correlation value results from random attenuation in the system (e.g., channel noise, etc.). A false positive from high-power interference against preamble L is more likely at times when the random attenuation is low; hence, the interfering signal is high. But, at the same time, the correlation with the preamble H is also likely to be high. Accordingly, if both preambles L and H are detected during a short time interval, a detector can conclude that it is an interfering packet and ignore it. Furthermore, if carrier is sensed, detection of the carrier can be declared regardless of the output of the correlators.

Figure 6:
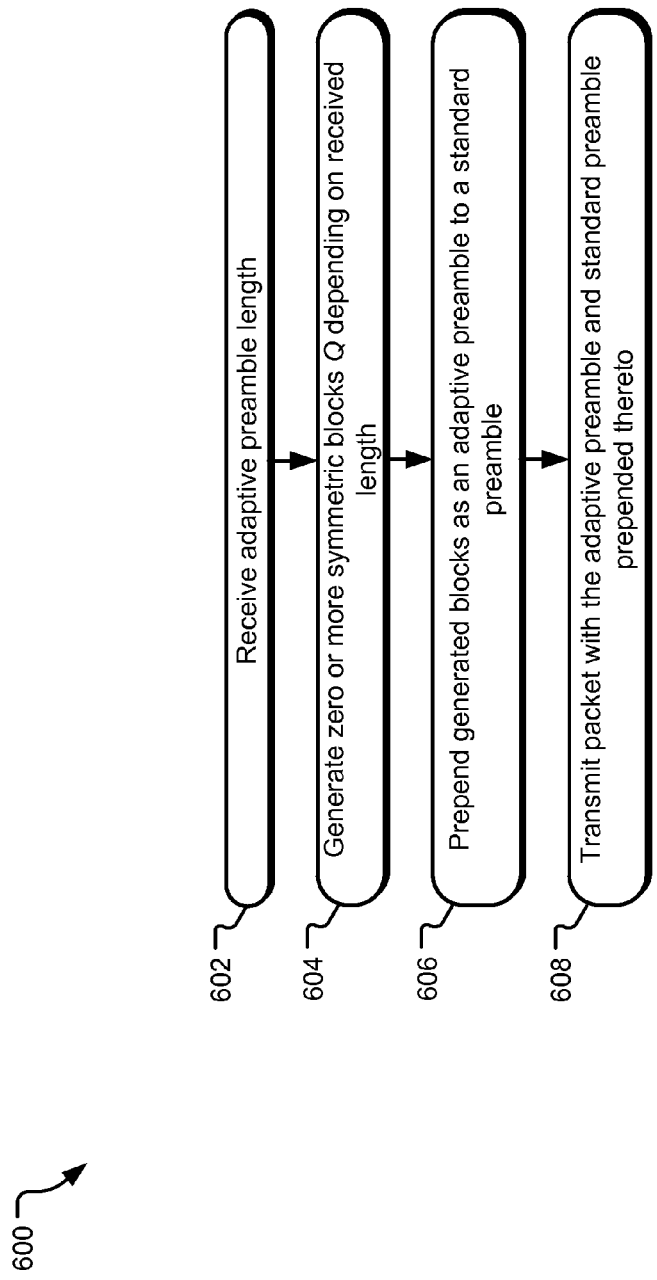
FIG. 6 illustrates example operations for transmitting an adaptive preamble.

FIG. 6 illustrates example operations 600 for transmitting an adaptive preamble. A receiving operation 602 receives an adaptive preamble length, such as from an adaptive preamble tuner in a MAC layer. The length may vary among predefined lengths within a predefined range from zero to K. A generating operation 604 generates zero or more symmetric blocks Q, depending on the received adaptive preamble length. A prepending operation 606 prepends the generated blocks as an adaptive preamble to a standard preamble. A transmission operation 608 transmits a data packet with the adaptive preamble and the standard preamble prepended thereto. Typically, a short-range node executes the transmission operation 608, although other categories of nodes may also transmit such packets.

Figure 7:
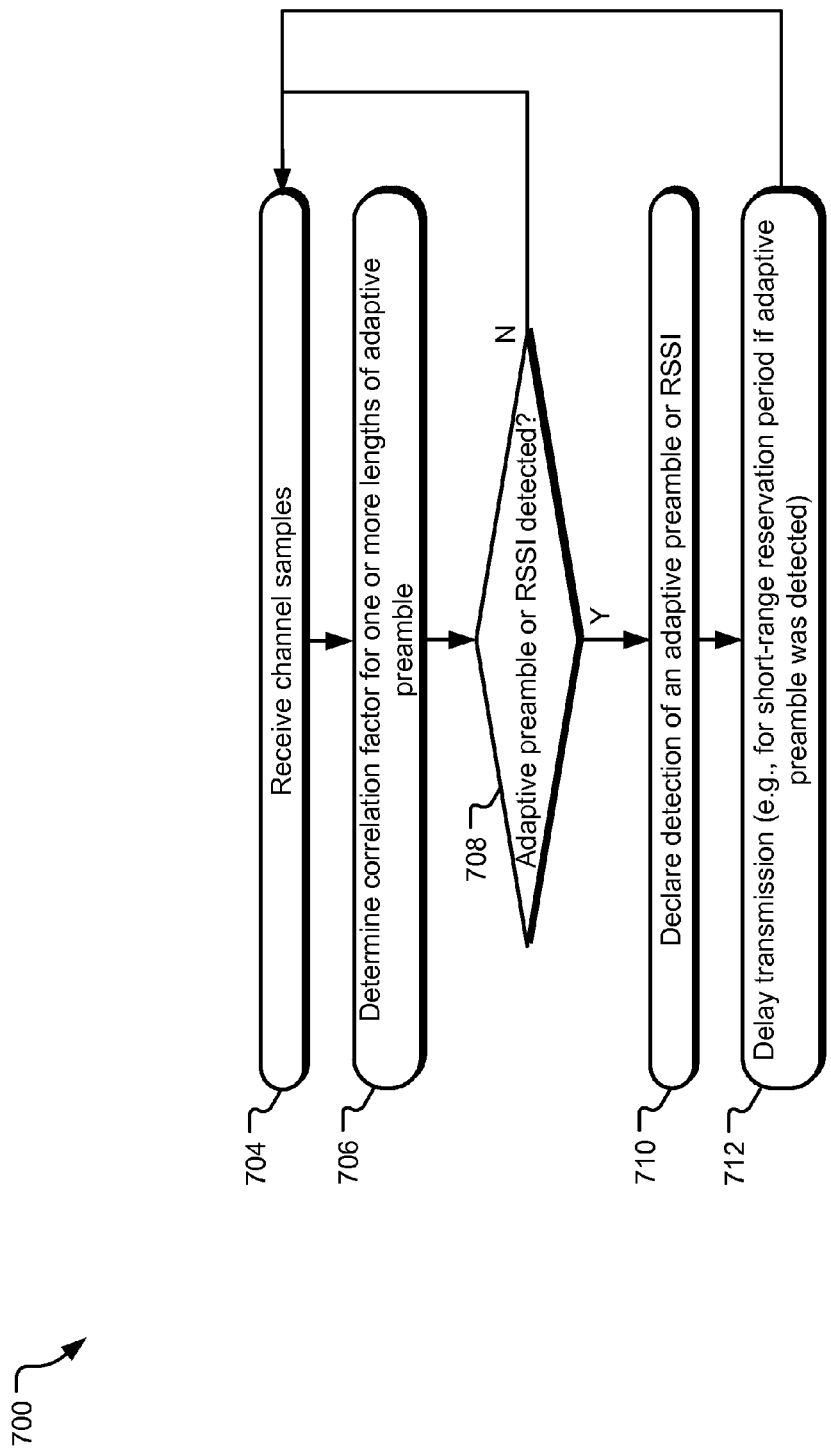
FIG. 7 illustrates example operations for detecting an adaptive preamble.

FIG. 7 illustrates example operations 700 for detecting an adaptive preamble. A receiving operation 704 receives channel samples, which include an adaptive preamble appended thereto. A correlation operation 706 determines a correlation factor for each of one or more lengths of supported adaptive preambles. A decision operation 708 determines whether an adaptive preamble or received signal strength indicator (RSSI) is detected. If neither an adaptive preamble nor an RSSI is detected, processing returns to the receiving operation 704, which implies a false negative in the assumed presence of a received adaptive preamble (as specified for the receiving operation 704). Otherwise, processing continues to a declaration operation 710, which declares that an adaptive preamble was detected. Such declaration triggers a transmission delay operation 712, in which the communications node does not transmit, for example, until expiration of a short-range reservation period if an adaptive preamble is detected. After expiration of the short-range reservation period, the communications node processing returns to the receiving operation 704.

Figure 8:
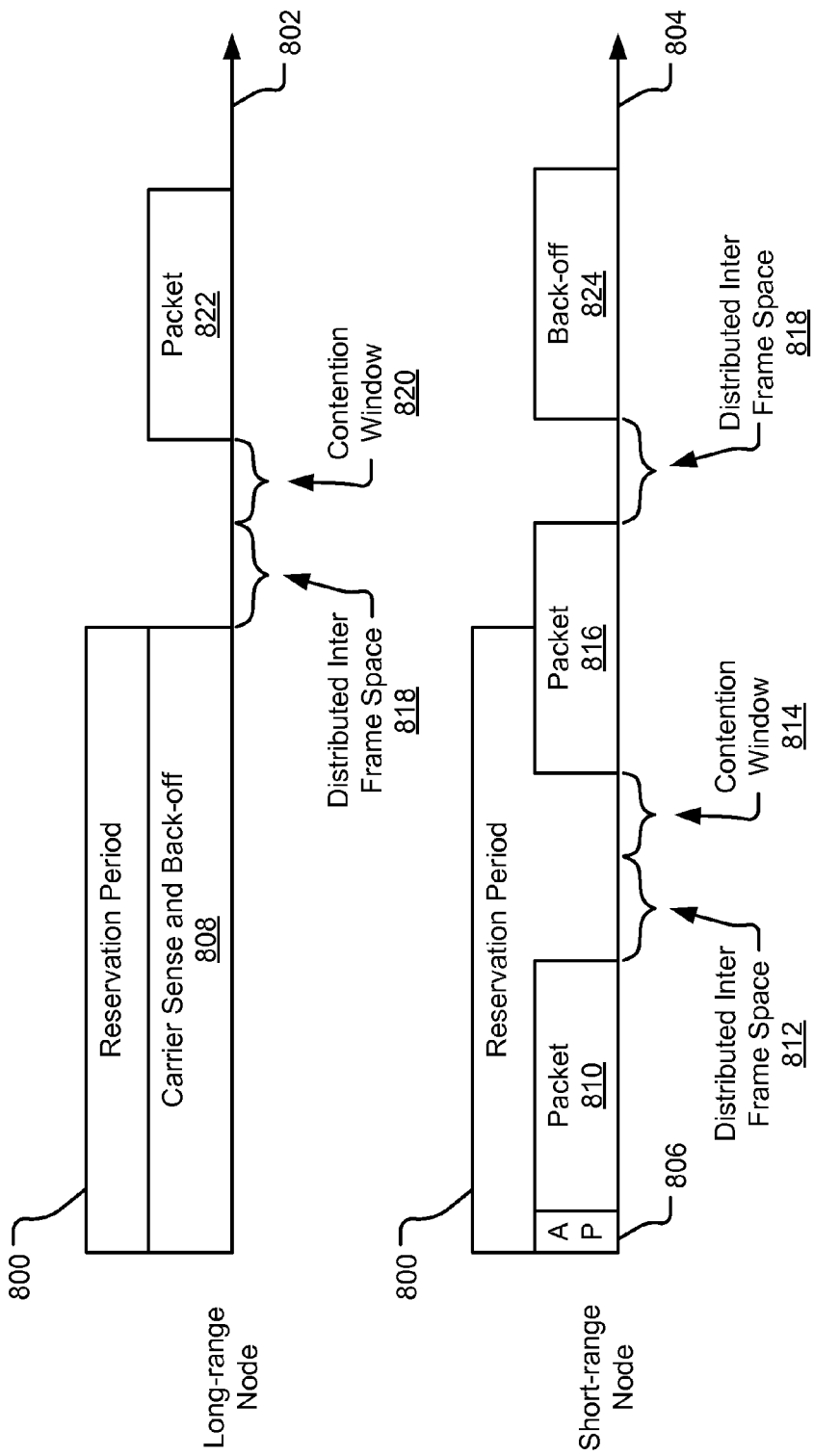
FIG. 8 illustrates an example short-range reservation period based on adaptive preambles.

FIG. 8 illustrates an example short-range reservation period 800 based on adaptive preambles. A timeline 802 corresponds to operations of a long-range node. Another timeline 804 corresponds to operations of a short-range node. Initially, the short-range node transmits an adaptive preamble (AP) 806, which is detected by the long-range node during carrier sense. Responsive to detection of the adaptive preamble, the long-range node backs-off (for the period shown as 808) during the predefined reservation period 800. Meanwhile, short-range node proceeds with transmission of its packet 810.

After transmission of the packet 810, the short-range node pauses transmission in compliance with a distributed inter frame space (IFS) 812 and contends for transmission among other short-range nodes during the contention window 814. Meanwhile, the long-range node continues to back off during the reservation period 800. After the contention windows 814, the short-range node transmits another packet 816.

After expiration of the reservation period 800, the long-range node pauses transmission in compliance with a distributed IFS 818 and contends for transmission among other nodes, both short-range and long-range, during the contention window 820. At this time, the long-range node wins the contention and transmits its packet 822, while the short-range node backs off its transmission during period 824.

Sending an adaptive preamble incurs overhead and prevents any long-range node that detects the adaptive preamble from transmitting concurrently. Accordingly, a short-range node's decision to send adaptive preambles, and how long each adaptive preamble should be, is a decision that can impact network performance.

If a short-range node does not detect another node interfering with its own transmissions, then the short-range node need not transmit a long preamble. If the short-range node detects a long-range node that interferes with its transmissions, then the short-range node can enter an adaptive preamble mode from which it can send a preamble in future transmissions that is just as long as necessary to prevent the particular interfering long-range node from transmitting concurrently, although the short-range node would be unlikely to block any other node further afield.

Packet losses may be used as feedback indicating whether to increase or decrease (or switch off) adaptive preambles, albeit distinguishing between losses due to a long-range interferer from other types of losses. A first type for packet loss within a wireless link is interference from concurrent transmission, which can be addressed using adaptive preambles. A second type for packet loss within a wireless link is MAC-level contention. As the number of nodes contending for medium access increases, so does the number of collisions that are caused by one or more links starting transmission at the exact same time slot (and, therefore, not having enough time to detect each other and avoid collision). If packets are lost due to contention, it may not be appropriate to use such packet losses to trigger adaptive preambles or an increase in the preamble length. In fact, longer preambles are likely to make conditions worse by introducing additional overhead to an already congested medium. A third type for packet loss within a wireless link is the link loss due to wireless channel changes, which again would be an inappropriate trigger for adaptive preambles or an increase in the preamble length.

The second type and third type of packet losses are unlikely to occur consecutively. In contrast, losses due to interference are very likely to occur in a sequence. Specifically, if a long-range node has data to send, and if it does not hear a short-range node, the long-range node will continuously transmit and kill several subsequent short-range transmissions. Also, consecutive packet losses are particularly bad for the link performance, as they will exponentially increase the back-off counter and cause link starvation.

Figure 9:
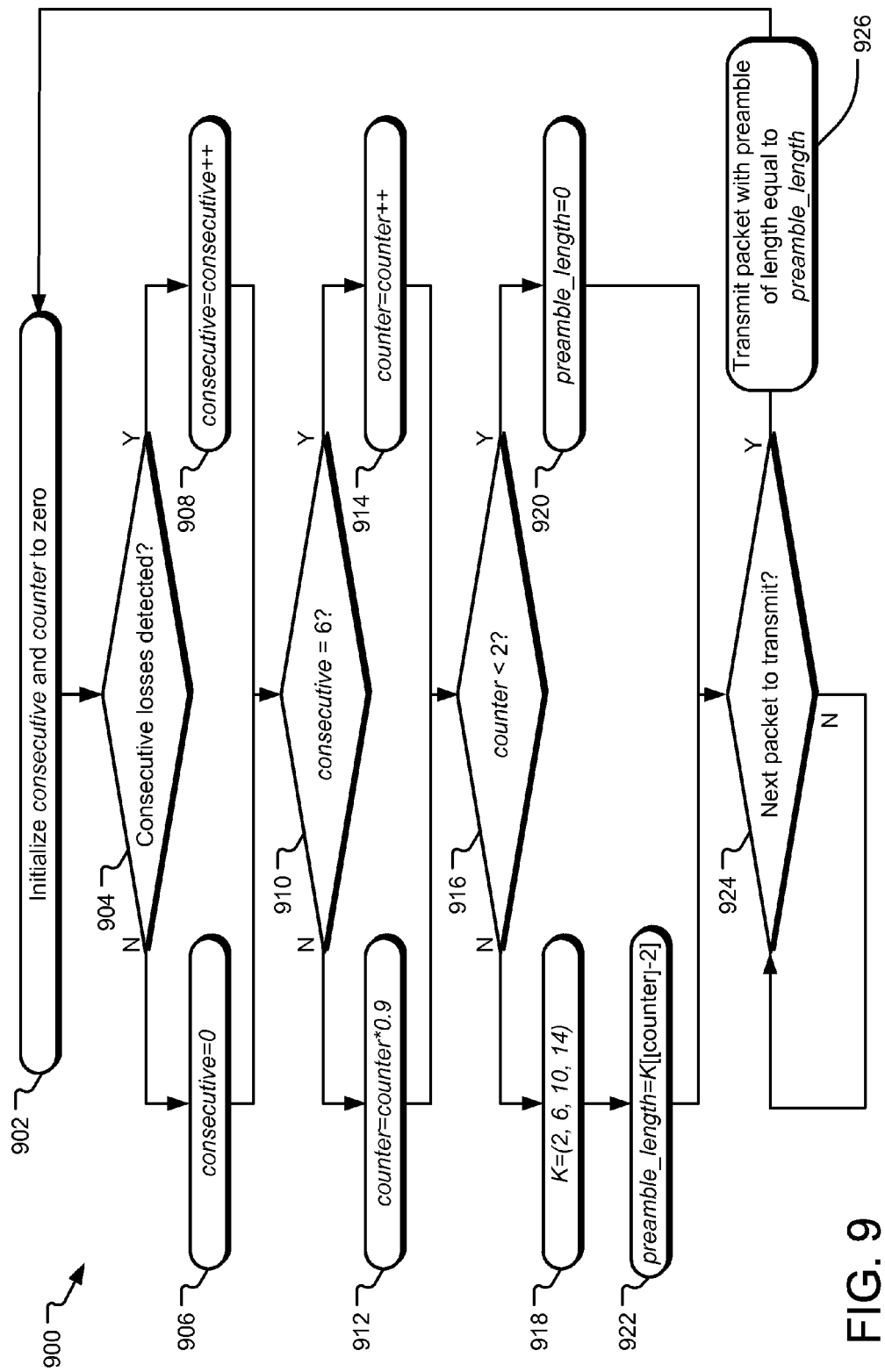
FIG. 9 illustrates example operations for tuning an adaptive preamble.

FIG. 9 illustrates example operations 900 for tuning an adaptive preamble using an adaptive preamble tuning algorithm based on the additive-increase, multiplicative-decrease (AIMD) principles. The number of consecutive packet losses, an example of a consecutive loss condition, is used as a measure of interference. Other techniques may be used to detect consecutive losses. An initialization operation 902 initializes variables consecutive and counter to zero. A decision operation 904 determines whether consecutive packet losses have been detected by the MAC layer of a short-range node. If so, an incrementing operation 908 increments the value of the variable consecutive. Otherwise, a reinitializing operation 906 sets the value of the variable consecutive to zero. A decision operation 910 determines whether the value of consecutive equals 6 (or some other predefined threshold). If so, an incrementing operation 914 increments the value of the variable counter. Otherwise, an adjusting operation 912 sets the value of the variable counter to 90% (or some other scaling factor) of its value.

Another decision operation 916 determines whether the value of the variable counter is less than 2 (or some other predefined threshold). If so, an initializing operation 920 sets the value of a variable preamble_length to zero. Otherwise, a setting operation 918 defines a set K to include one or more preamble length values (e.g., 2, 4, 10, and 14), and a sizing operation 922 sets the value of preamble_length equal to one of the members of set K. The counter represents the highest integer number lower than the counter. As such, in this example, if counter is smaller than 2, then no adaptive preamble is transmitted (preamble_length=0). If 2<=counter<3, then counter=2, K[counter-2]=K[0]=2, and the preamble length is set to 2; If 3<=counter<4, then counter=3, K[counter-2]=K[0]=6, and the preamble length is set to 6; and so on in a similar fashion.

A decision operation 924 waits until the next packet is transmitted, at which time a transmission operation 926 transmits the next packet with a preamble length equal to the value of the variable preamble_length. Processing then returns to the initialization operation 902.

Figure 10:
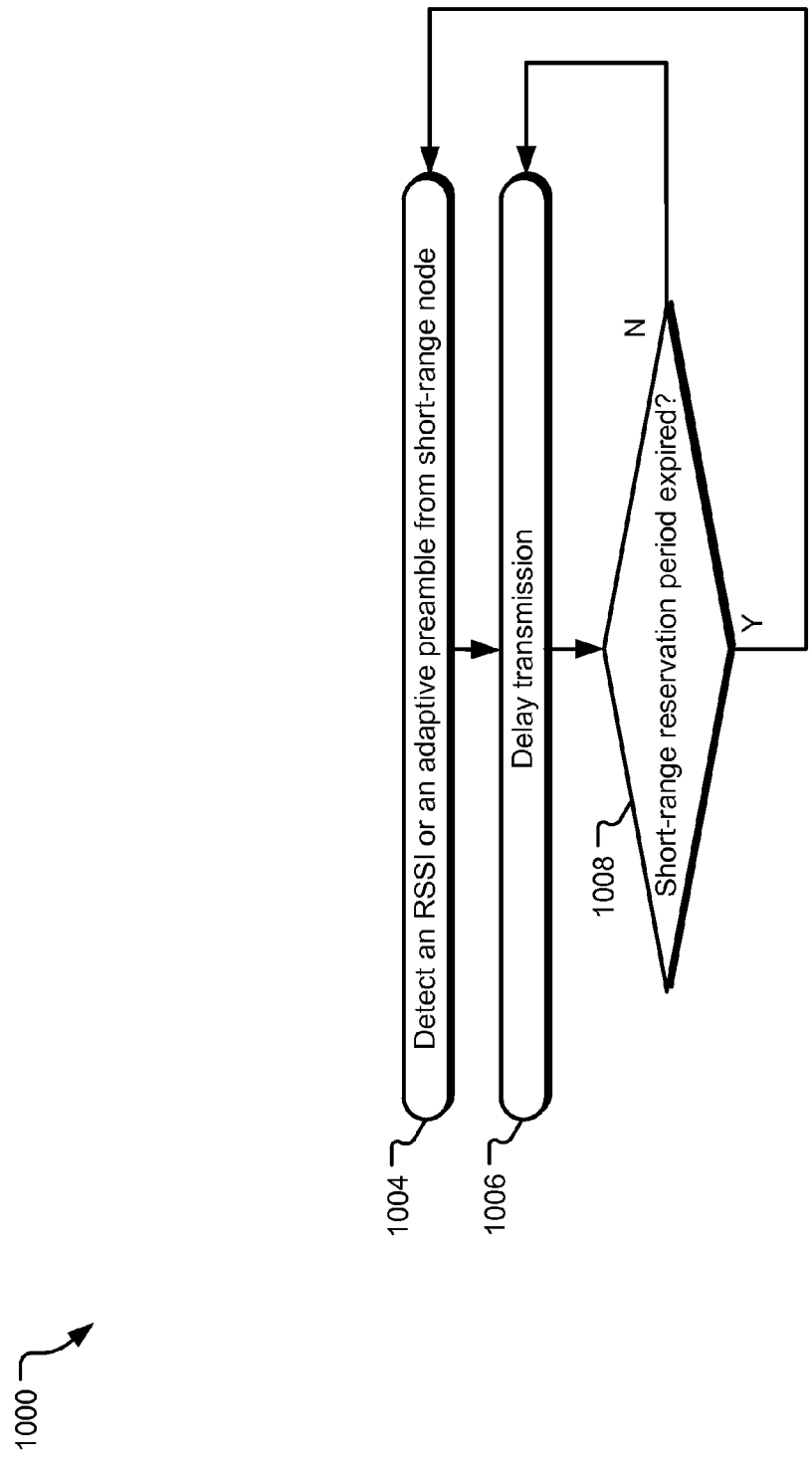
FIG. 10 illustrates example operations responsive to detection of an adaptive preamble by a long-range node.

FIG. 10 illustrates example operations 1000 responsive to detection of an adaptive preamble by a long-range node. A detection operation 1004 detects an RSSI or an adaptive preamble transmitted by a short-range node. Responsive to detection of the adaptive preamble, a delay operation 1006 delays transmission by the long-range node for the period of the short-range reservation period. Expiration of the reservation period is monitored by the decision operation 1006, after which processing is returned to the contention operation 1002.

Figure 11:
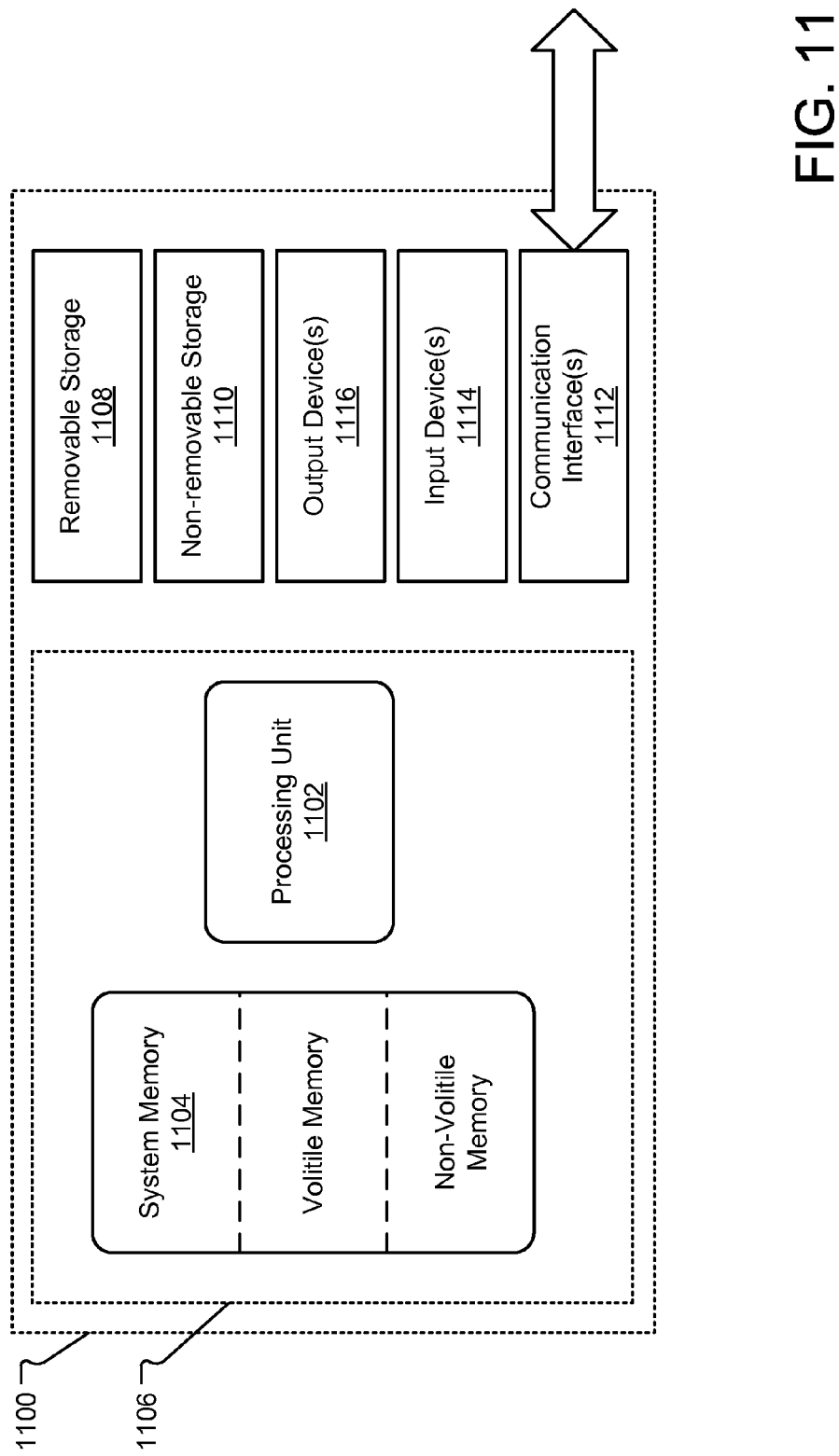
FIG. 11 illustrates an example of a suitable communications device in which the described technology may be implemented.

FIG. 11 illustrates an example of a suitable communications device 1100 in which the described technology may be implemented. In its most basic configuration, the communications device 1100 typically includes at least one processing unit 1102 and memory 1104. Depending on the exact configuration and type of computing device, the memory 1104 may be volatile (such as RAM), non-volatile (such as ROM, flash memory, etc.). This most basic configuration is illustrated in FIG. 11 by dashed line 1106.

Additionally, the communications device 1100 may also have additional features/functionality. For example, the communications device 1100 may also include additional storage (removable and/or non-removable) including without limitation magnetic or optical disks or tape. Such additional storage is illustrated in FIG. 11 by removable storage 1108 and non-removable storage 1110. Storage media may include volatile and nonvolatile, removal and non-removable media meant in any method or technology for storage of information, such as computer readable instructions, data structures, program modules, or other data. The memory 1104, the removable storage 108, and the non-removable storage 1110 are all examples of computer-readable storage media. Computer-readable storage media includes, but is not limited to, RAM, ROM, EEPROM, flash memory, or other memory technology, CD-ROM, digital versatile disks (DVD) or other storage, magnetic cassettes, magnetic tape, magnetic disk storage, or other magnetic storage devices, or any other medium that can be used to store the desired information and which can be accessed by the communications device 1100. Any such computer-readable storage media may be part of a communications device 1100.

The communications device 1100 may also contain communication interface(s) 1112 that allow the device to communicate with other devices. The communication interface(s) 1112 may include without limitation a wireless communications interface (e.g., a WiFi® transceiver, a Bluetooth® transceiver) and/or a wired communications interface (e.g., an Ethernet network interface, a serial or parallel ports). One or more wired or wireless connections 1118 may be established via the communication interface(s) 1112.

The communications device 1100 may also have input device(s) 1114, such as a keyboard, a mouse, a pen, a voice input interface, a touch input interface, etc. Output device(s) 1116, such as a display, speakers, a printer, etc., may also be included.

In an example implementation, an adaptive preamble tuner, an adaptive preamble transmitted, a reservation manager, a detector with a transmitter and other modules and services may be embodied in circuitry and/or by instructions stored in memory 1104 and/or storage 1108 and 1110 and processed by the processing unit 1102. Thresholds, preamble symbols, packets, and other data may be stored in memory 1104 and/or storage devices 1108 and 1110 as persistent datastores.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

Although the subject matter has been described in language specific to structure features and/or methodological acts, it is to be understood that the subject matter defined in the appended claims is not necessarily limited to the specific features or acts described above. Rather the specific features and acts described above are disclosed as example forms of implementing the claims.

The above specification, examples, and data provide a complete description of the structure and use of exemplary implementations of the described technology. Since many implementations can be made without departing from the spirit and scope of the described technology, the invention resides in the claims hereinafter appended. Furthermore, structural features of the different embodiments may be combined in yet another embodiment without departing from the recited claims.

What is claimed:

1. A method executed by a long-range node that is in wireless communication with a short-range node, the method comprising:
   receiving, from the short-range node and over a frequency band in the radio frequency spectrum, a packet with an adaptive preamble, wherein a length of the adaptive preamble is a function of detected consecutive packet loss due to interference between the long-range node and the short-range node;
   responsive to receiving the packet, determining:
      a first correlation factor for a candidate adaptive preamble length; and
      a second correlation factor for a second candidate adaptive preamble length;
   declaring a detection of the adaptive preamble when either:
      the first correlation factor exceeds a first adaptive preamble threshold; or
      the second correlation factor exceeds a second adaptive preamble threshold; and
   responsive to declaring the detection of the adaptive preamble, delaying transmission of a second data packet for a reservation period.

2. The method of claim 1 wherein the receiving, determining, and declaring operations are PHY layer processes performed at the long-range node.

3. The method of claim 1 further comprising:
   constructing the second packet for transmission to the short-range node; and
   responsive to declaring the detection of the adaptive preamble, delaying transmission of the second packet to the short-range node for the reservation period.

4. The method of claim 3 wherein the reservation period is predefined.

5. The method of claim 1 wherein the delaying operation is a MAC layer process performed in the long-range node.

6. The method of claim 1 the long-range node being located outside a transmit range of the short-range node.

7. A long-range network node that comprises:
   a processor; and
   memory storing instructions that, when executed by the processor, cause the long-range network node to perform a processor-implemented process comprising:
      receiving, from a short-range network node and over the radio frequency spectrum, a packet with an adaptive preamble, a length of the adaptive preamble is a function of detected consecutive packet loss due to interference between the long-range network node and the short-range network node;
      determining
         a correlation factor for one or more candidate adaptive preamble lengths;
      declaring a detection of an adaptive preamble when the correlation factor exceeds an adaptive preamble threshold; and
      responsive to declaring the detection of the adaptive preamble, delaying transmission of a second packet for a reservation period.

8. The long-range network node of claim 7, wherein the receiving, determining, and declaring operations are PHY layer processes performed at the long-range network node.

9. The long-range network node of claim 7 wherein the processor-implemented process further comprises:
   constructing the second packet for transmission to the short-range network node; and
   responsive to declaring the detection of the adaptive preamble, delaying transmission of the second data packet for a reservation period, the long-range network node classified as a long-range node based upon an amount of power used by the long-range network node to transmit data.

10. The long-range network node of claim 9 wherein the reservation period is predefined.

11. The long-range network node of claim 7, wherein the delaying operation is a MAC layer operation.

12. The long-range network node of claim 7, wherein the long-range network node is located outside the transmit range of the short-range network node.

13. A long-range communications device, comprising:
   a processing unit; and
   system memory, the system memory comprising instructions that, when executed by the processing unit of the long-range communications device, cause the processing unit to perform acts comprising:
      determining, based on an adaptive preamble of a data packet received from a short-range communications device, a correlation factor for a candidate adaptive preamble length, a length of the adaptive preamble being a function of consecutive packet loss between the long-range communications device and the short-range communications device due to interference;
      declaring a detection of the adaptive preamble when the correlation factor is above a predefined threshold; and
      responsive to declaring the adaptive preamble, delaying transmission of a second data packet at least for a reservation period.

14. The long-range communications device of claim 13 wherein the reservation period is predefined.

15. The long-range communications device of claim 13, the long-range communications device being located outside a defined transmit range of the short-range communications device.

16. The method of claim 1, the adaptive preamble configured to extend transmission range of the short-range node.

17. The method of claim 1, wherein determining the first correlation factor comprises determining the first correlation factor based upon a correlation between a received sequence of symbols from the short-range node and the received adaptive preamble.

18. The long-range communications device of claim 13, wherein determining the correlation factor comprises determining the correlation factor based upon a correlation between a received sequence of symbols from the short-range node and the received adaptive preamble.

19. The long-range network node of claim 7, wherein determining the correlation factor comprises determining the correlation factor based upon a correlation between a received sequence of symbols from the short-range node and the received adaptive preamble.

20. The long-range communications device of claim 13, further comprising transmitting the second data packet to the short-range communications device after the reservation period has passed.

* * * * *